Dec. 9, 1969   R. J. SAVAGE ET AL   3,483,567
RECORDING DISPLACEMENT GAGE
Filed June 5, 1968   2 Sheets-Sheet 1
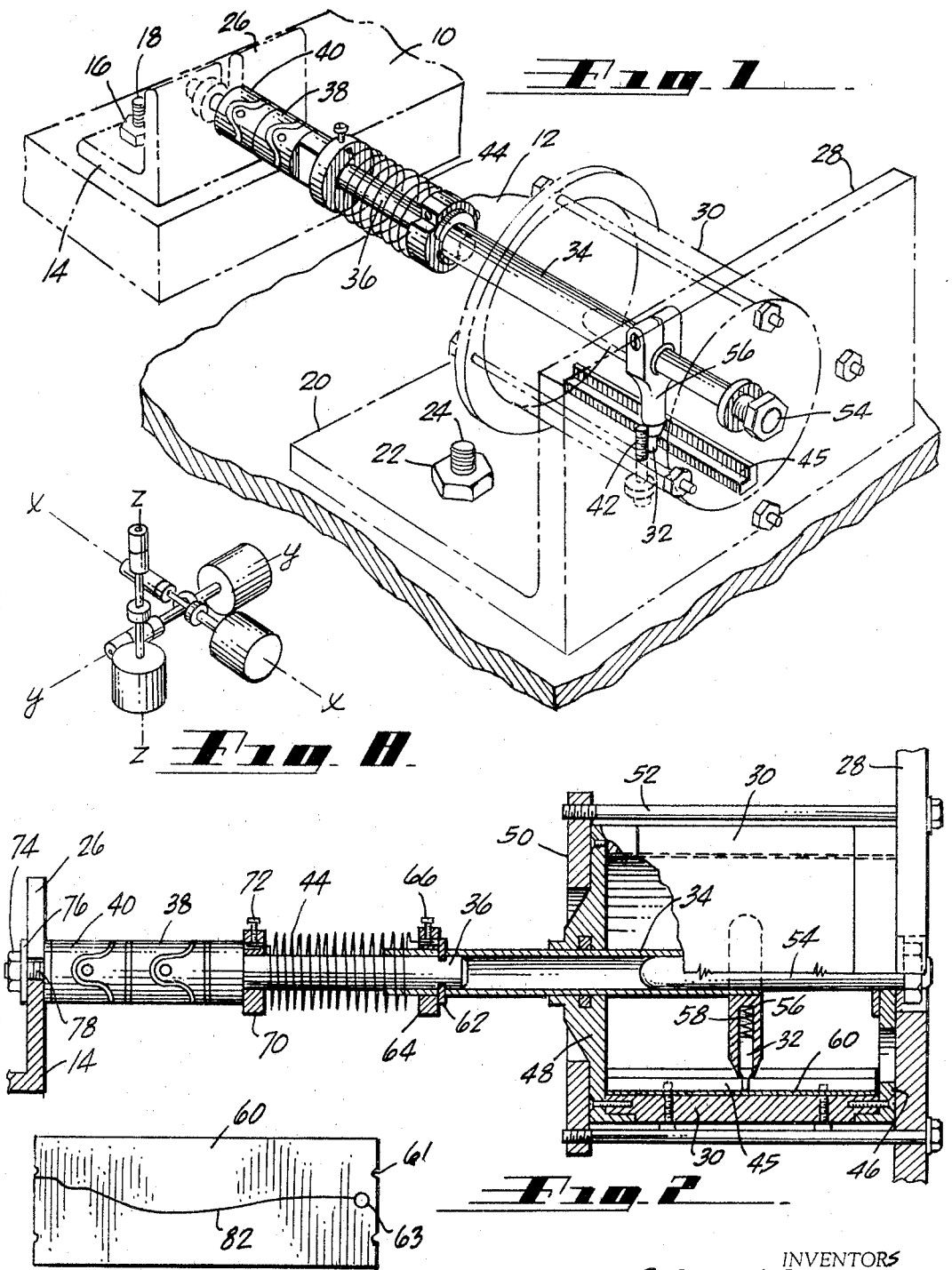
INVENTORS
ROBERT J. SAVAGE
RICHARD V. SMITH
BY Robert O. Richardson
— ATTORNEY —

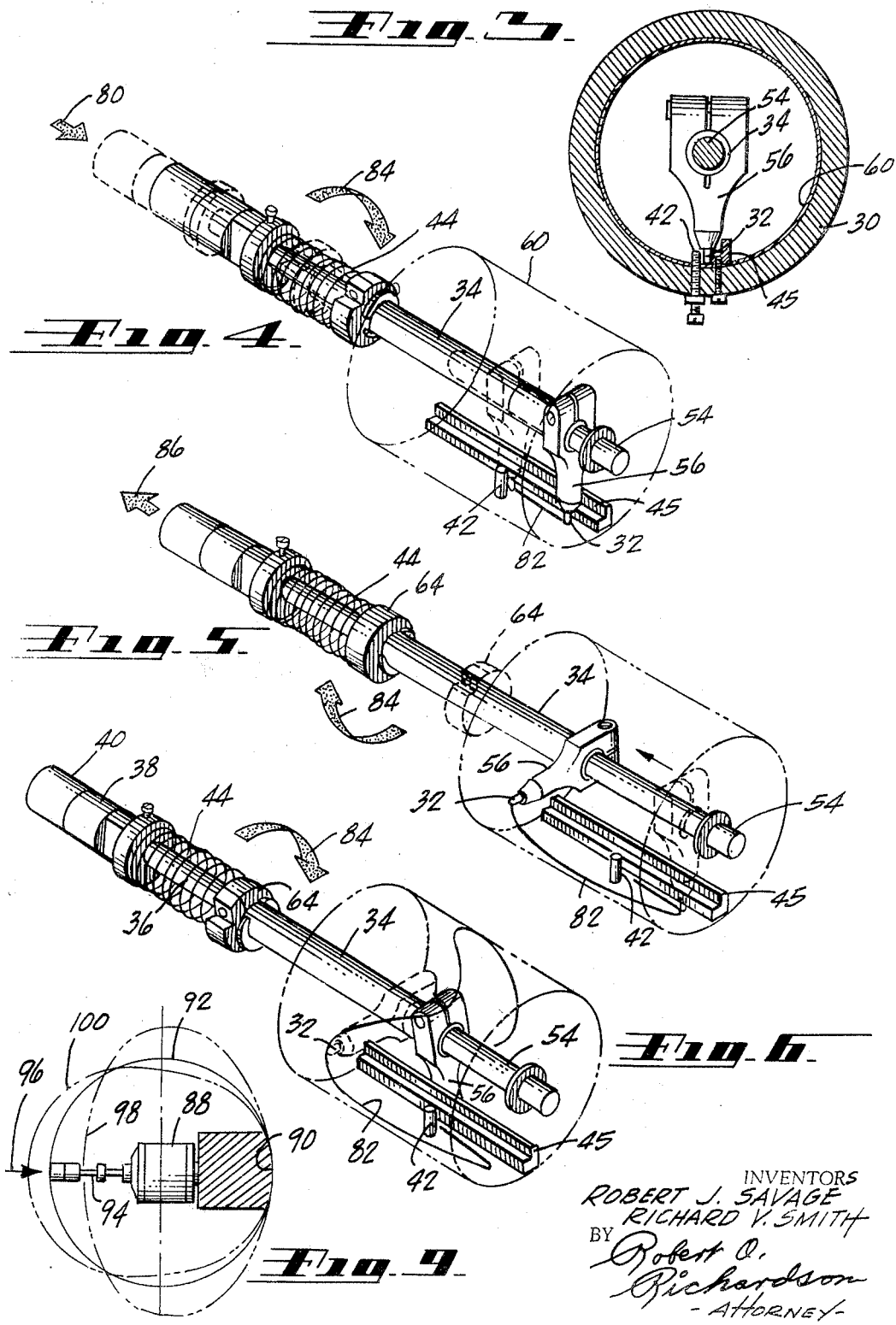

United States Patent Office 3,483,567
Patented Dec. 9, 1969

3,483,567
RECORDING DISPLACEMENT GAGE
Robert J. Savage, Pacific Palisades, and Richard V. Smith, Palos Verdes Peninsula, Calif., assignors to McDonnell Douglas Corporation, a corporation of Maryland
Filed June 5, 1968, Ser. No. 734,808
Int. Cl. G01d 15/02
U.S. Cl. 346—77                                    6 Claims

ABSTRACT OF THE DISCLOSURE

An all mechanical displacement gage for measuring the time history displacements of an explosively excited structure. A time base, scriber, and displacement trigger are incorporated into one lightweight mechanism for preserving the total displacement history when the device is released by an initial deflection which forms a part of the total displacement record. The deflection gage comprising the present invention solves the problem of obtaining deflections of a structural component when subjected to a severe environment of X-ray radiations and electromagnetic pulses which make active devices such as electrical and electronic measuring devices inoperative.

Summary of the invention

The displacement gage comprising the present invention utilizes a spring drive means for making a permanent record of movement of a scribing stylus coupled to receive the force being recorded. In an illustrative embodiment, the recording medium is the inner surface of a metal cylinder and the stylus is coupled to a force receiving element, such that the stylus moves longitudinally as well as along the axis of rotation of the record cylinder. A latching element is provided to prevent record motion until a predetermined force has been achieved. The spring drive system is preset in accordance with the friction of the record cutting operation such that the stylus is moved through one revolution in a predetermined time period.

A simple metal stylus or scriber is mounted on a revolving torsion spring loaded shaft interlocked rigidly with, and rotated on, guide rod, which is attached to the surface of the specimen in which deflection is to be measured. The rotating scriber imparts a trace on a replaceable shim made of metallic material placed inside the recording cylinder. The recording shim can be replaced at will be removing the cylinder and cap screws and removing the end cap.

Brief description of the drawings

FIGURE 1 is a perspective view with parts in phantom showing the gage in cocked position;
FIG. 2 is an elevational view of the gage with parts shown in cross-section;
FIG. 3. is a sectional view of the end of the gage;
FIGS. 4, 5 and 6 are perspective views showing the scriber at various points during its operation;
FIG. 7 is a perspective view showing a trace made by the scriber on the recording medium in the displacement gage;
FIG. 8 is a schematic illustrating the installation of a multiple of gages where the direction of the shock is unknown; and
FIG. 9 is a schematic illustration showing an alternate use of the gage.

Referring now to FIG. 1, there is shown in phantom a first base 10 and a second base 12 between which points relative movement will be experienced. Bracket 14 is fastened to base 10 by means of nut 16 and bolt 18. Bracket 20 is fastened to base 12 by means of nut 22 and bolt 24. Bracket 14 has an upstanding shoulder 26 and bracket 20 has an upstanding shoulder 28. The displacement gage comprising the present invention is mounted between these shoulders and measures displacement therebetween when a shock occurs. The gage consists of a recording cylinder 30 (shown in phantom lines) having a recording shim on its inner surface on which a trace may be made by a rotating scriber 32. This scriber is mounted on a revolving, torsion spring loaded cylindrical shaft 34 interlocked rigidly with, and rotated on, a guide rod 36 which is connected to bracket 26 through couplings 38 and 40. Torsion spring 44 causes scriber 32 to rotate after a shock or deflection has caused it to move along the axis of shaft 34 to free it from engagement of stop pin 42. Stop bar 45 limits the scriber to one rotation.

As can best be seen, in FIG. 2 the recording cylinder 30 has end caps 46, 48 affixed to each end thereof and a mounting plate 50 is positioned over end cap 48 and secured to bracket shoulder 28 by means of a plurality of bolts 52. Shaft 34 is rotatably mounted in end cap 48 and shaft support 54 is positioned on end cap 46. Stylus holder 56 is fastened to shaft 34 and rotates therewith. The stylus holder has an aperture in which stylus 32 is positioned. The stylus is urged outwardly by spring 58 into pressing engagement with shim 60 for making a mark thereon as the stylus is rotated about the shim and moves laterally therealong as directed by the shaft 34. Shim 60 may be coated with carbon black, if desired, so that the movement of the stylus may be indicated. Guide rod 36 fits into the outer end of shaft 34 to which it is rotatably connected with a clip 62. A spring stop 64 is positioned over shaft 34 and retained by screw 66. A torsion spring 44 is under tension from a predetermined number of turns required for the time span desired and is fastened under tension by spring adjuster 70 in which screw 72 secures the end of the spring. Couplings 38 and 40 pivotally connect the guide rod 36 to mounting bracket 26 by means of nut 74 and lock washer 76 over a threaded shaft portion 78 of coupling 40.

Referring now to the end sectional view in FIG. 3, there is shown the cylinder 30 with a recording plate or shim 60 positioned about the inner circumference thereof. Centrally positioned is a shaft support 54 over which a cylindrical shaft 34 is rotatably and longitudinally movable. Affixed to shaft 34 is a stylus holder 56 having a stylus 32 at the outer end thereof in contact with the shim 60. Stylus 32 is positioned against stop pin 42 in its cocked position ready for rotation in a clockwise manner. Stop bar 45 prevents continued rotation after the first revolution has been made.

In FIGS. 4, 5 and 6 there is shown the gage with the stylus in intermediate steps in making a trace as it responds laterally to the deflection force applied. As shown in FIG. 4, a force in the direction of arrow 80 causes the stylus 32 to move in that direction, away from its stop pin 42, and make a mark 82 on the recording shim 60. Torsion spring 44 exerts a torque in the direction of arrow 84. After the initial shock in the direction of arrow 80, the force is reversed to the direction shown by arrow 86 in FIG. 5. The torsion spring 44 continues to rotate the stylus holder 56 in the direction of arrow 84. The stylus 32 continues to draw the line 82 through one complete revolution on the shim in the inner surface of the barrel. In FIG. 6 the stylus holder 56 continues to make the full revolution and stops against stop bar 45. The time required for making this revolution is a function of the number of turns of the torsion spring 58.

After the deflection shock has occurred, the record plate or shim 60 is then removed and discloses the trace of the line 82 as shown in FIG. 7. The horizontal component of this trace is in a direction normal to the direction of the shock wave and the deflection device should be positioned in this manner when such direction of shock wave can be established prior to its occurrence. In the event the direction of the shock wave is unknown, a three axis system should be used, as shown in FIG. 8. Here the three units are positioned so that one unit is in alignment with the x-axis, another with the y-axis and the third with the z-axis. Upon the occurrence of a shock, the record plates of the three units can be correlated to establish the direction and magnitude of the force.

In FIG. 9 there is shown a typical gage installation in a thin wall shell showing the extremes of dynamic shell motion. Here a suitable gage 88 is mounted on the inner wall 90 of shell 92 with a support rod 94 engaging the diametrically opposed wall. Upon application of a force in a direction of arrow 96, the shell collapses to the position shown by numeral 98 and thereafter the shell reverses its direction to the position shown by numeral 100. Support rod 94 causes the scriber to move laterally as it rotates within the gage housing to record this motion.

This deflection gage typically was designed to measure deflections covering the time span of 10 to 400 milliseconds, but can be adapted to other time ranges by appropriate replacement and cocking of the torsion spring. The time span is initiated by a stylus restraining stop that releases the scriber and allows it to rotate around the recording cylinder after an initial deflection of ±.050 inch. This release distance may be changed to whatever initial releasing deflection is required by simply machining the restraining stop to the required release thickness. The stylus makes one revolution of the recording barrel and comes to rest on a stop bar. A permanent record of the time-deflection history is obtained by extracting the recording shim and photographing, a procedure which can be accomplished any time after the record is made. An important feature of this gage is in the mechanism designed to provide an accurate time base by non-electrical methods that is initiated at the proper instant by the very characteristic that is being measured. Thus, these gages can be positioned, cocked and remain active for long periods of time in inaccessable places before being called upon to measure deflections. In addition, they can measure deflections without any prior alert as to possible movement of the structures being measured.

From the foregoing description of the illustrative embodiment, it is obvious that other modifications and variations will occur to one skilled in the art and it is to be understood that these deviations from the above described embodiment is to be considered as part of the invention.

What is claimed is:

1. A displacement gage for recording the displacement between two points comprising:
   a cylinder mounted at one point and having an axis passing through the other point,
   a shaft positioned along the axis of said cylinder adapted to rotate and move longitudinally therealong,
   a rotation means for rotating said shaft,
   a stylus holder on said shaft adapted to move therewith,
   a stylus on said holder engageable with the inner surface of said cylinder,
   a recording medium on the inner surface of said cylinder to record movement of said stylus thereover, and
   means affixed to the other of said points for moving said shaft longitudinally along said axis.

2. A displacement gage as set forth in claim 1 wherein said shaft is cylindrical and a shaft support extends therein from one end of said cylinder to support said shaft.

3. A displacement gage as set forth in claim 1, wherein said rotation means is a torsion spring means, and stop means against which said stylus may be positioned to prevent such rotation until there is longitudinal movement of said stylus.

4. A displacement gage as set forth in claim 3, and additional stop means limiting said stylus to one revolution.

5. A displacement gage as set forth in claim 4 wherein the first stop means is a stop pin and said additional stop means is a stop bar extending along the inner surface of said cylinder.

6. A displacement gage as in claim 1 wherein said recording medium is a carbon black coated metallic shim on which may be scribed motions of said stylus passing thereover.

References Cited

UNITED STATES PATENTS

| 598,042 | 1/1898 | Wildermann et al. | 346—111 |
| 3,331,078 | 7/1967 | Howland | 346—77 X |

JOSEPH W. HARTARY, Primary Examiner

U.S. Cl. X.R.

33—147; 346—111